(12) United States Patent
Mamidwar et al.

(10) Patent No.: US 10,554,571 B2
(45) Date of Patent: Feb. 4, 2020

(54) PACKET-TO-PACKET TIMING RECONSTRUCTION FOR CHANNEL BONDING

(71) Applicant: Broadcom Corporation, Irvine, CA (US)

(72) Inventors: Rajesh Shankarrao Mamidwar, San Diego, CA (US); Anand Tongle, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 70 days.

(21) Appl. No.: 15/238,980

(22) Filed: Aug. 17, 2016

(65) Prior Publication Data

US 2017/0054649 A1   Feb. 23, 2017

Related U.S. Application Data

(60) Provisional application No. 62/206,679, filed on Aug. 18, 2015.

(51) Int. Cl.
*H04L 25/14*   (2006.01)
*H04L 12/863*   (2013.01)
(Continued)

(52) U.S. Cl.
CPC .......... *H04L 47/624* (2013.01); *H04L 25/14* (2013.01); *H04L 65/4069* (2013.01); *H04L 1/1841* (2013.01); *H04L 69/22* (2013.01)

(58) Field of Classification Search
CPC ... H04L 1/1841; H04L 47/34; H04L 49/9057; H04L 47/624; H04L 65/4084;
(Continued)

(56) References Cited

U.S. PATENT DOCUMENTS 6,363,429 B1 * 3/2002 Ketcham .......... H04L 29/06027
                                                  709/231
6,744,764 B1 * 6/2004 Bigdeliazari ....... H04L 12/6418
                                                  370/394

(Continued)

OTHER PUBLICATIONS

Digital Video Broadcasting (DVB); Second generation framing structure, channel coding and modulation systems for Broadcasting, Interactive Services, News Gathering and other broadband satellite applications (DVB-S2), Part I; ETSI EN 302 307, V1.2.1, Aug. 2009, pp. 1-78, European Telecommunications Standards Institute, Valbonne, France.

(Continued)

*Primary Examiner* — Salvador E Rivas
*Assistant Examiner* — Lalita W Pace
(74) *Attorney, Agent, or Firm* — Morgan, Lewis & Bockius LLP

(57) ABSTRACT

A stream at a source device may be transmitted over multiple channels. At the input of the channels the packets from the stream may be grouped into chunks. Informational packets may be appended to the chunks. The informational packets may include sequencing information for the chunks and packet-to-packet timing information. The chunks may then be distributed over the multiple channels. After transmission over the channels, the informational packets may be extracted from the chunks. Reconstruction circuitry, at the destination device, may determine the sequence of the chunks at the source device based on the sequencing information. The reconstruction circuitry may also determine relative timings of the packets within the single stream based on the packet-to-packet timing information. The packets may be released from buffers in accord with the determined packet-to-packet timing information and the sequencing information to recreate the relative timings within the single stream at the destination device.

20 Claims, 6 Drawing Sheets

(51) Int. Cl.
*H04L 29/06* (2006.01)
*H04L 1/18* (2006.01)

(58) Field of Classification Search
CPC ..... H04L 65/602; H04L 65/607; H04L 25/14; H04L 65/4069; H04L 69/22; H04N 21/2343
USPC .......................................................... 370/394
See application file for complete search history.

(56) References Cited

U.S. PATENT DOCUMENTS

| | | | | |
|---|---|---|---|---|
| 6,801,544 | B1* | 10/2004 | Rijckaert | G11B 27/3027 348/512 |
| 8,259,739 | B2* | 9/2012 | Huang | H04L 45/00 370/413 |
| 8,861,346 | B2* | 10/2014 | Skoog | H04L 47/10 370/230 |
| 2003/0012197 | A1* | 1/2003 | Yazaki | H04L 47/10 370/392 |
| 2003/0048812 | A1* | 3/2003 | Gross | H04L 1/205 370/516 |
| 2003/0138051 | A1* | 7/2003 | Chen | H04N 21/234318 375/240.26 |
| 2006/0165376 | A1* | 7/2006 | Park | H04N 9/8042 386/330 |
| 2009/0028142 | A1* | 1/2009 | Schmidt | H04N 7/173 370/389 |
| 2011/0013701 | A1* | 1/2011 | Henocq | H04N 19/89 375/240.25 |
| 2011/0283009 | A1* | 11/2011 | Martinez | H04N 21/6125 709/231 |
| 2013/0021525 | A1* | 1/2013 | Karunakar | H04N 21/2368 348/515 |
| 2013/0235884 | A1* | 9/2013 | Mamidwar | H04L 5/0044 370/468 |
| 2016/0234127 | A1* | 8/2016 | Agarwal | H04L 67/2852 |

OTHER PUBLICATIONS

Digital Video Broadcasting (DVB); Second generation framing structure, channel coding and modulation systems for Broadcasting, Interactive Services, News Gathering and other broadband satellite applications (DVB-S2), Part II: S2-Extensions (DVB-S2X)-(Optional); DVB Document A83-2; Mar. 2014, pp. 1-114, European Telecommunications Standards Institute, Valbonne, France.

* cited by examiner

PACKET-TO-PACKET TIMING RECONSTRUCTION FOR CHANNEL BONDING

1. PRIORITY CLAIM

This application claims priority to provisional application Ser. No. 62/206,679, filed Aug. 18, 2015, which is entirely incorporated by reference.

2. TECHNICAL FIELD

This disclosure relates to audio and video communication techniques. In particular, this disclosure relates to channel bonding for audio and video communication.

3. BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices will help continue to drive demand for not only the devices, but for the content delivery services that feed the devices.

DETAILED DESCRIPTION

The architectures and techniques discussed below may be used to reconstruct the timing present in an original stream at a source device in a recovered stream at a destination device after the stream is sent over one or more transmission channels. At the input of the transmission channels the packets may be grouped in chunks, e.g., bundles of multiple packets. In some cases, the chunks may include groups of sequential packets.

In some cases, video receivers, such as, set top boxes, may rely on packet-to-packet timings sent over a broadcast channel. However, techniques such as channel bonding may affect packet arrival timings at a video receiver. The techniques and architectures described below may be used to recover packet-to-packet timings irrespective of delay differences among multiple channels in bonded groups.

An informational packet, such as a bundle identifier packet (BIP), may be appended to one or both ends of the chunks. The informational packets may include packet-to-packet timing information for recovery of the timing of the stream at the output of the transmission channels. For example, the packet-to-packet timing information may include average packet spacing for the chunk, a sampled spacing derived from one or more packet-to-packet intervals, recorded time stamps for individual packets, or other packet-to-packet timing information. In some cases, the transmission channels may impart latency or relative delay to the packets during transmission. Thus, the relative timings of the received packets may differ from the timing of the packets at the transmission channel input. After transmission over the channels, the timing information may be extracted from the information packets and used to reconstruct the relative timings present in the original stream. For example, the packets may be reordered, e.g., by a packet sequencer, to match the original order of the packets within the original stream. The informational packets may further include sequencing information for the chunks. Thus, upon reception, the system may resequence the chunks and recover packet-to-packet timing information using the informational packets that are appended to the chunks.

Figure 1:
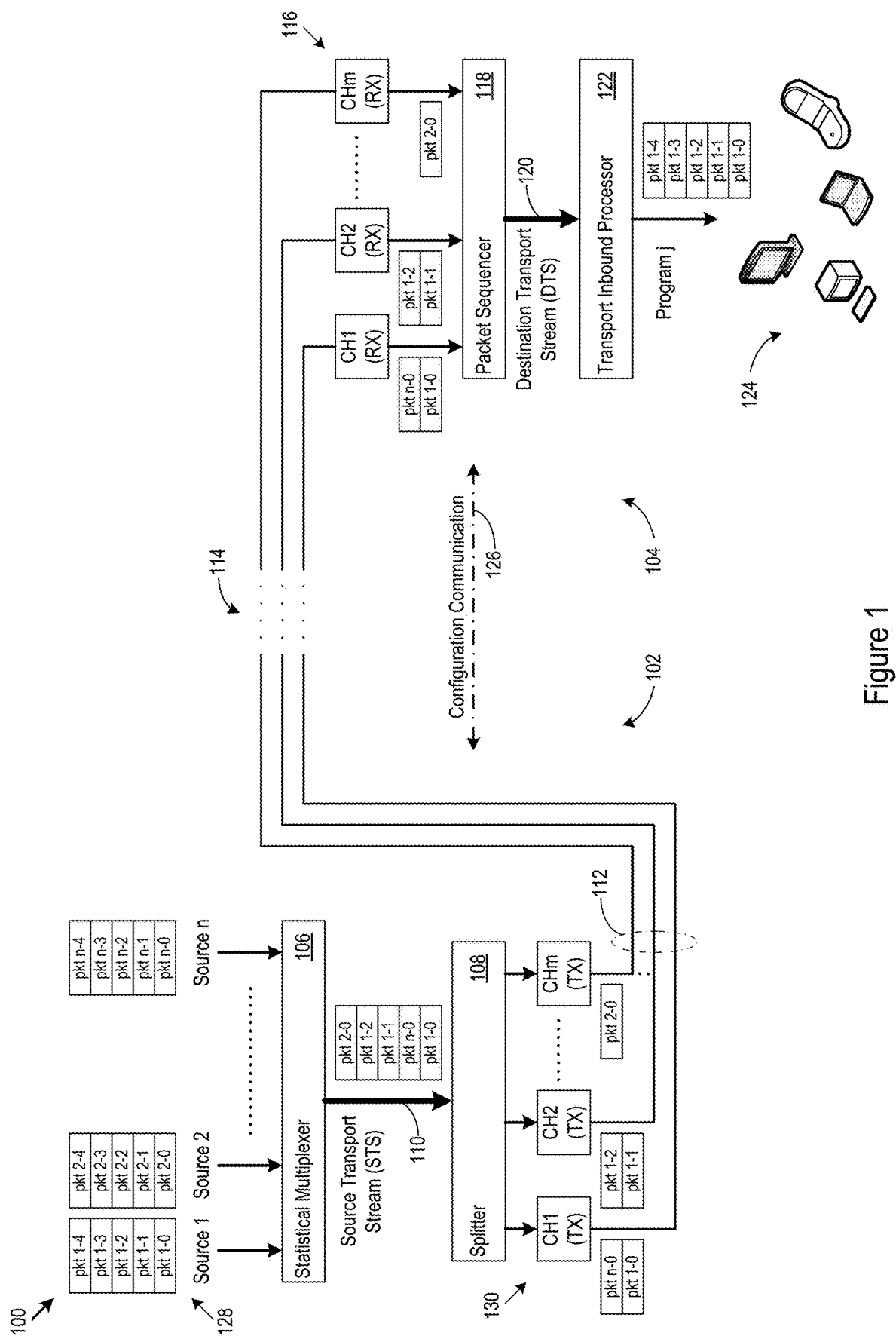
FIG. 1 shows an example content delivery architecture.

FIG. 1 shows an example content delivery architecture 100. The architecture 100 delivers data (e.g., audio streams and video programs) from a source 102 to a destination 104. The source 102 may include satellite, cable, or other media providers, and may represent, for example, a head-end distribution center that delivers content to consumers. The source 102 may, for example, receive the data in the form of Motion Picture Expert Group 2 (MPEG2) Transport Stream (TS) packets 128, when the data is audio/visual programming. The destination 104 may be a home, business, or other location, where, for example, a set top box processes the data sent by and received from the source 102. The discussion below makes reference to packets, and in some places specific mention is made of MPEG2 TS packets. However, the techniques described below may be applied to a wide range of different types and formats of communication units, whether they are MPEG2 TS packets, packets of other types, or other types of communication units, and the techniques are not limited to MPEG2 TS packets at any stage of the processing.

The source 102 may include a statistical multiplexer 106 and a splitter 108. The statistical multiplexer 106 helps make data transmission efficient by reducing idle time in the source transport stream (STS) 110. In that regard, the statistical multiplexer 106 may interleave data from multiple input sources together to form the STS 110. For example, the statistical multiplexer 106 may allocate additional STS 110 bandwidth among high bit rate program channels and relatively less bandwidth among low bit rate program channels to provide the bandwidth needed to convey widely varying types of content at varying bit rates to the destination 104 at any desired quality level. Thus, the statistical multiplexer 106 very flexibly divides the bandwidth of the STS 110 among any number of input sources.

Several input sources are present in FIG. 1: Source 1, Source 2, . . . , Source n. There may be any number of such input sources carrying any type of audio, video, or other type of data (e.g., web pages or file transfer data). Specific examples of source data include MPEG or MPEG2 TS packets for digital television (e.g., individual television programs or stations), and 4K×2K High Efficiency Video Coding (HVEC) video (e.g., H.265/MPEG-H) data, but the input sources may provide any type of input data. The source data (e.g., the MPEG 2 packets) may include program identifiers (PIDs) that indicate a specific program (e.g., which television station) to which the data in the packets belongs.

The STS 110 may have a data rate that exceeds the transport capability of any one or more communication links between the source 102 and the destination 104. For example, the STS 110 data rate may exceed the data rate supported by a particular cable communication channel exiting the source 102. To help deliver the aggregate bandwidth of the STS 110 to the destination 104, the source 102 includes a splitter 108 and modulators 130 that feed a bonded channel group 112 of multiple individual communication channels. In other words, the source 102 distributes the aggregate bandwidth of the STS 110 across multiple outgoing communication channels that form a bonded channel group 112, and that together provide the bandwidth for communicating the data in the STS 110 to the destination 104.

In that regard, the multiple individual communication channels within the bonded channel group 112 provide an aggregate amount of bandwidth, which may be less than, equal to, or in excess of the aggregate bandwidth of the STS 110. As just one example, there may be three 30 Mbs physical cable channels running from the source 102 to the destination 104 that handle, in the aggregate, up to 90 Mbs or more. The communication channels in the bonded channel group 112 may be any type of communication channel, including dial-up (e.g., 56 Kbps) channels, ADSL or ADSL 2 channels, coaxial cable channels, wireless channels such as 802.11a/b/g/n channels or 60 GHz WiGig channels, Cable TV channels, WiMAX/IEEE 802.16 channels, Fiber optic, 10 Base T, 100 Base T, 1000 Base T, power lines, or other types of communication channels.

The bonded channel group 112 travels to the destination 104 over any number of transport mechanisms 114 suitable for the communication channels within the bonded channel group 112. The transport mechanisms may include physical cabling (e.g., fiber optic or cable TV cabling), wireless connections (e.g., satellite, microwave connections, 802.11 a/b/g/n connections), or any combination of such connections.

At the destination 104, the bonded channel group 112 is input into individual channel demodulators 116. The channel demodulators 116 recover the data sent by the source 102 in each communication channel. A packet sequencer 118 collects the data recovered by the demodulators 116, and may create a destination transport stream (DTS) 120. The DTS 120 may be one or more streams of packets recovered from the individual communication channels as sequenced by the packet sequencer 118.

The destination 104 also includes a transport inbound processor (TIP) 122. The TIP 122 processes the DTS 120. For example, the TIP 122 may execute program identifier (PID) filtering for each channel independently of other channels. To that end, the TIP 122 may identify, select, and output packets from a selected program (e.g., a selected program 'j') that are present in the DTS 120, and drop or discard packets for other programs. In the example shown in FIG. 1, the TIP 122 has recovered program 'j', which corresponds to the program originally provided by Source 1. The TIP 122 provides the recovered program to any desired endpoints 124, such as televisions, laptops, mobile phones, and personal computers. The destination 104 may be a set top box, for example, and some or all of the demodulators 116, packet sequencer 118, and TIP 122 may be implemented as hardware, software, or both in the set top box.

The source 102 and the destination 104 may exchange configuration communications 126. The configuration communications 126 may travel over an out-of-band or in-band channel between the source 102 and the destination 104, for example in the same or a similar way as program channel guide information, and using any of the communication channel types identified above. One example of a configuration communication is a message from the source 102 to the destination 104 that conveys the parameters of the bonded channel group 112 to the destination 104.

Figure 2:
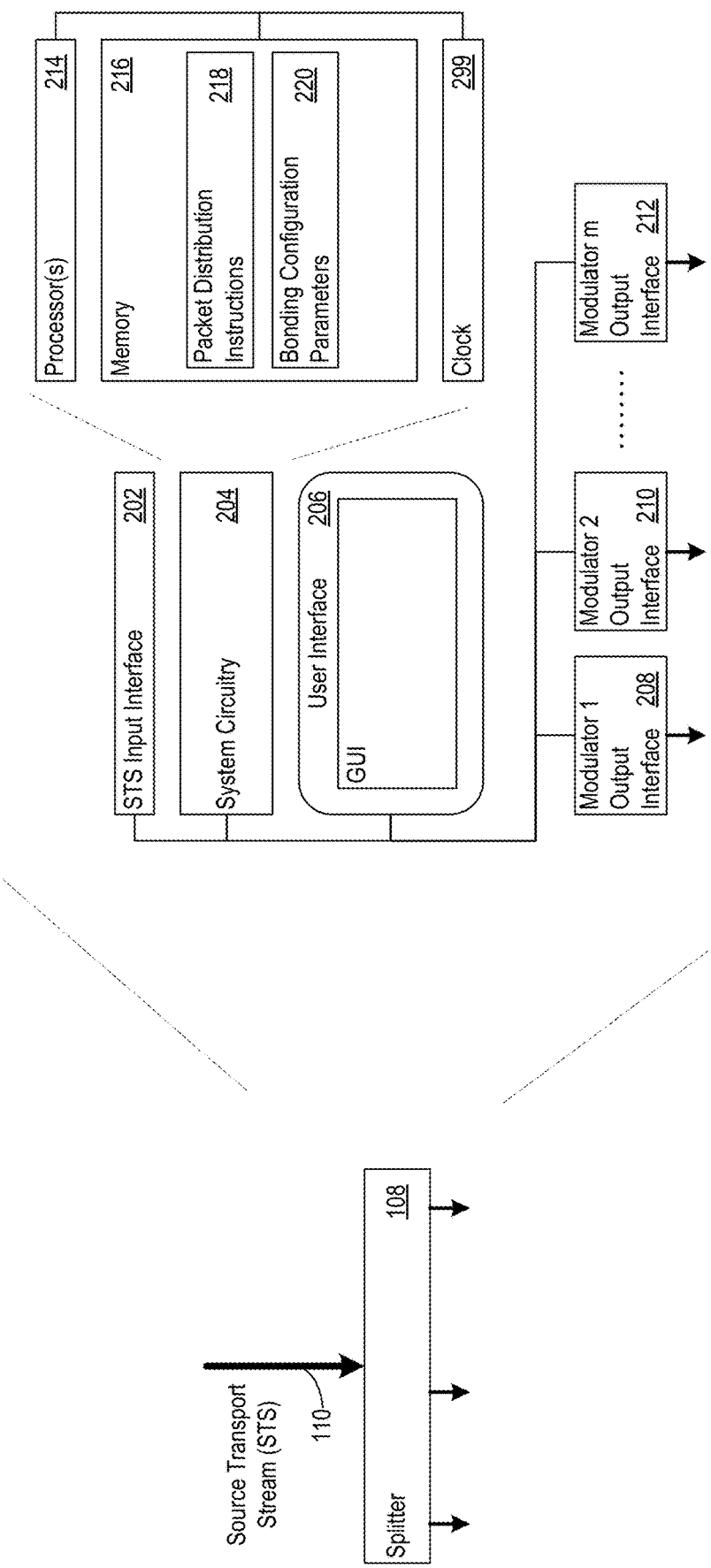
FIG. 2 shows an example implementation of a splitter.

Turning now to FIG. 2, the figure shows an example implementation of a splitter 108. The splitter 108 includes an STS input interface 202, system circuitry 204, and a user interface 206. In addition, the splitter 108 includes modulator output interfaces, such as those labeled 208, 210, and 212. The STS input interface 202 may be a high bandwidth (e.g., optical fiber) input interface, for example. The modulator output interfaces 208-212 feed data to the modulators that drive data over the communication channels. The modulator output interfaces 208-212 may be serial or parallel bus interfaces, as examples.

The system circuitry 204 implements in hardware, software, or both, any of the circuitry described in connection with the operation of the splitter 108. As one example, the system circuitry 204 may include one or more processors 214 and program and data memories 216. The program and data memories 216 hold, for example, packet distribution instructions 218 and the bonding configuration parameters 220.

The processors 214 execute the packet distribution instructions 218, and the bonding configuration parameters 220 inform the processor as to the type of channel bonding the processors 214 will perform. The distributor 200 may accept input from the user interface 206 to change, view, add, or delete any of the bonding configuration parameters 220 or any channel bonding status information. The system circuitry 204 may further include a clock 299 to measure average timings or sampled timings for packet-to-packet intervals. In some implementations, a 27-MHz free-running clock circuit may be used to generate the timing measurements.

In various implementations, Cable or Satellite head-end and set-top box implementations may perform channel bonding at layers other than the PHY layer. However, PHY layer bonding may also be used. Further, some implementations may use a single bit rate for channels in a bonded group. Although this may reduce flexibility in selecting individual channel bit-rates in a bonded group, a single bit rate may allow for reduced processing performance constraints. Further, the channel bonding system may support channels without specific skew constraints. Thus, the system may resequence packet streams with channel-to-channel skews of arbitrary size. However, the system may implement timeout mechanisms to avoid allowing the system to remain in a hold state waiting indefinitely for delayed or lost channel data.

A bundle or chunk may include a group of consecutive MPEG2TS packets in a stream. In some implementations, MPEG2TS packets from the same bundle may be routed to the same modulator or transponder during channel bonding. Different bundles may be routed to the same or different modulators or transponders. In some cases, a round-robin by chunk scheme may be used to distribute the chunks over the bonded channels.

The system may use informational packets, such as BIPs, which may be a MPEG2TS packet with an informational payload. The informational packets may include packet-to-packet timing information, chunk routing information, and other information to support transport, routing, and reconstruction of chunks. In some cases, a specific program identifier (PID) may be reserved using the informational packets. The informational packets may be identified by references the reserved PID. The informational packets may include a generic channel bonding clock reference (GCBCR). The GCBCR may be a timestamp for a chunk boundary, a packet, or both. In some cases, a 27-MHz reference clock may be used to generate the timestamp.

Video compression may often be performed by the system at variable bit rates. For efficient multiplexing of variable-bit rate video programs, up to 4-6 or more video programs may be multiplexed into a single stream. 4K/UHD programs consume more bandwidth during transport than do HD or SD programs, which reduces number of video programs that can be multiplexed on single channel, which may affect multiplexing efficiency. For example, a 4K progressive scan stream at 60 frames per second may consume up to 30 Mbps or more. For broadcasts, generating a single channel with the bandwidth to handle multiple UHD streams may be comparatively expensive when compared to combining multiple channels into a single pipe. For example, a single high bandwidth modulated may be more expensive than multiple lower bandwidth modulators. Hence, channel bonding may be used to increase multiplexing efficiency by creating higher bandwidth data pipes than may be created using a single channel. In some implementations, up to 2-8 or more channels may be bonded to create a single pipe.

In some systems, informational packets appended to the ends of chunks of consecutive packets from an initial input stream. Chunk sizes of up to 128 packets or more may be used. However, other chunk sizes such as 48, 60, 64, 256, or other numbers of packets may be used within a chunk. In some cases, 128 packet chunks allows for operator-perceived system responsiveness to actions such as channel changes with system overhead that is lower than systems using smaller chunk sizes. Further, in some systems, chunk sizes of $2^N$ packets where N is an integer value may be used so that the packets within a chunk may be designated using a whole number of bits. However, as noted above, chunk sizes, in some implementations, may not necessarily conform to the $2^N$ packet sizing. Further, the chunk size may be set dynamically, for example, in response to changing channel conditions.

Figure 3:
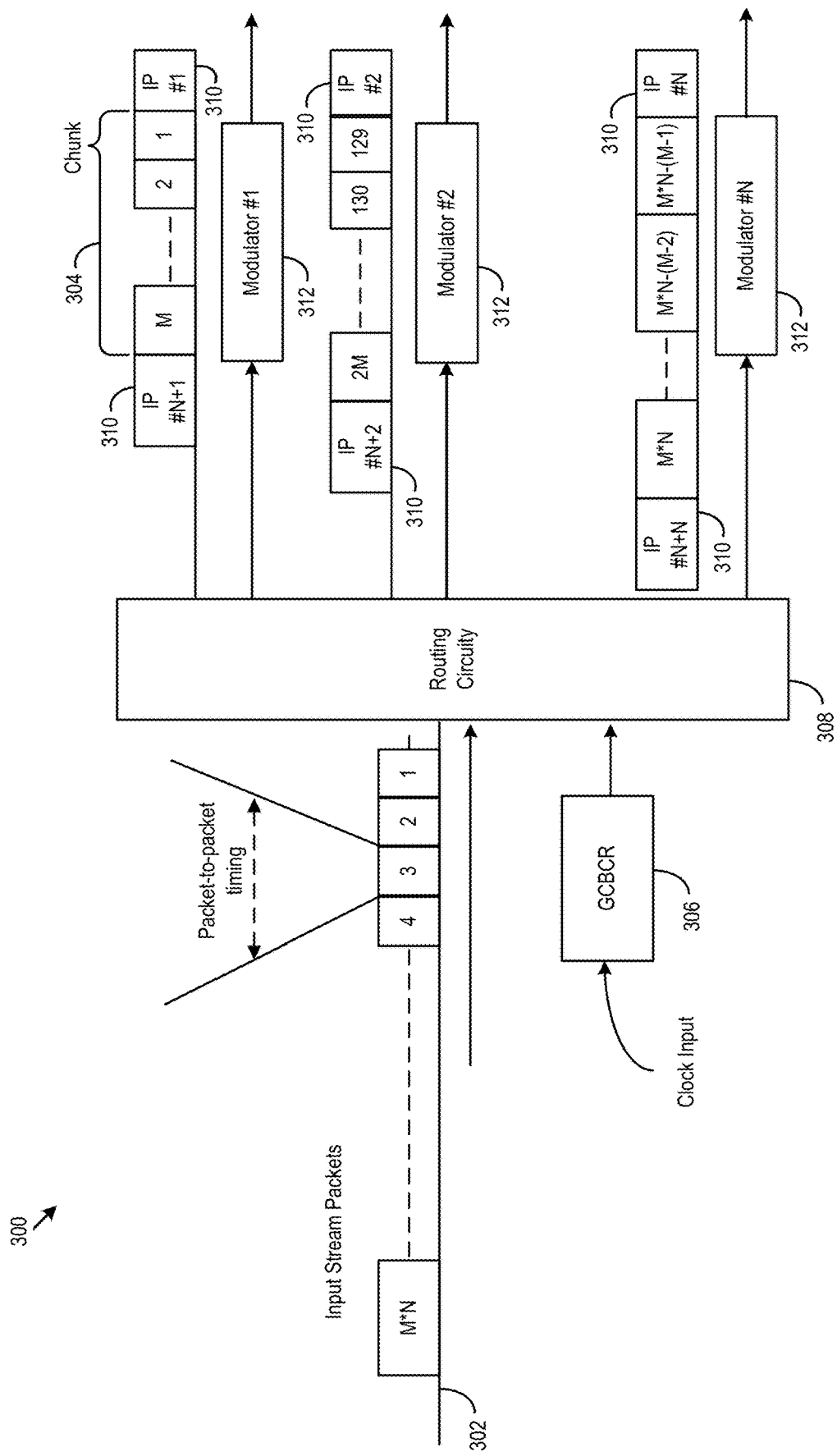
FIG. 3 shows example distributor circuitry, which may be included within the splitter.

FIG. 3 shows example distributor circuitry 300, which may be included within the splitter 108. The example distributor circuitry may include an input 302 for receiving an input stream. The distributor circuitry 300 may generate chunks at the system chunk size by dividing the input stream into chunks 304.

The routing circuitry 308 may then attach informational packets (IP) 310 to the ends of the chunks. The clock references from generation of the informational packets 310 may be provided by the clock reference (CR) circuitry 306, which may be fed with a clock signal input, for example from a 27 MHz free running clock or other clock input. In some cases, the CR circuitry may provide the GCBCR for informational packet timestamping. The CR circuitry 306 may be used to sample the timings for packet-to-packet durations or may be used to determine timings for chunk boundaries or other timings. In some cases, an average packet-to-packet interval may be used. For example, the chunk boundary timings may be determined and then the total end-to-end timing for the chunk may be divided by the chunk size, e.g., the number of packets in the chunk. The timings including calculated averages may be included in the information packets 310. The packet-to-packet timings, whether average timings or actual time measurements, may be used by a packet sequencer to reconstruct the timing of the stream at the input 302 (or at least an estimate of the timing at the input 302).

The system may use a single chunk size or a dynamic chunk size which may be determined according to relative channel bandwidths, latency, or other system parameters. In some cases, a single chuck size may allow for simpler stream reconstruction upon reception when compared to multiple or dynamic chunk size systems.

In some cases, to maintain a system defined chunk size, null packets may be inserted into the chunks. In some cases, the null packets may be inserted next to chunk boundaries. In some implementations, if the sum of the channel bandwidth is larger than the STS, the system may adjust the output to account for the difference. For example, null packets may be inserted on chunk boundaries, new dummy chunks may be created to occupy the excess bandwidth, or other data structures may be transmitted to occupy the bandwidth.

The stream may be distributed to the modulators 312 by the GCB router 308. The GCB router 308 may distribute the stream by chuck to the routers. Various distributions schemes may be used, such as round robin or other distribution schemes.

In some cases, the chunks may be distributed to the bonded channels such that the order of the multiple consecutive packets within a chunk is guaranteed to be preserved while the chunks are transmitted over the bonded channels. For example, each chunk may be distributed such that it is sent over a single channel. Accordingly the chunks may not necessarily be divided up during distribution over the bonded channels. In some cases, even when the order of the multiple consecutive packets within a chunk is guaranteed to be preserved, the multiple chunks may arrive out-of-order at the destination. Accordingly, the chunks may be resequenced in some cases where packet-level resequencing is not necessary.

The routing circuitry 308 may also include a chunk sequence number in the in the informational packet 310. In some cases, the chunk sequence number may include a number including the packet stream sequence number for the beginning or end of a chunk. Upon reception, a packet sequencer may select the channel with the lowest sequence number for buffer unloading. The sequence number in the informational packets may be used for sequencing the chunks (or some portion thereof) after transmission over the bonded channel group.

Additionally or alternatively, a separate sequence number for the informational packet may be appended to the informational packet. Upon reception, a packet sequence may locate the channel buffer with the highest informational packet sequence number and unload the buffers of the other channels until a new highest informational packet sequence number is found.

However, virtually any sequencing or numbering scheme which allows the order of the packets at the input 302 to be reconstructed after transport may be used.

Table 1 shows an example structure for an example BIP. Fields 1 and 2 may include the BIP PID, which may be used to identify the BIP. Field 4 may include the adaptation field. The adaptation field may include the packet-to-packet timings, the BIP sequencing information or other information for stream reconstruction.

TABLE 1

Example Bundle Identifier Packet (BIP) structure

| Field | Constant Value | Meaning |
|---|---|---|
| 0 | 0x47 | Transport Sync Byte |
| 1 | {3'b001, BIP_PID MSB} | Transport_priority = 1<br>Upper 5 bits of the Bundle Identifier PID |
| 2 | BIP PID LSB | Lower 8 bytes of the Bundle Identifier PID |
| 3 | 0x20 | Transport Scrambling control (2'b00), Adaptation field control (2'b10), Continuity count (4'b0000) |
| 4 | 0xb7 | Adaptation field length may be 183 bytes. |
| 5 | 0x02 | Set transport private data flag |
| 6 | 0x2D | Private Data Field Length |
| 7 | 0xF0 | Data Field Tag for the Bonding Packet Signature (0xA0 to 0XFF may be user defined) |
| 8 | 0x0C | Length of the Bundle Tag Version |
| 9 | 0x42 | 'B' - signature |
| 10 | 0x55 | 'U' - signature |
| 11 | 0x4E | 'N' - signature |
| 12 | 0x44 | 'D' - signature |
| 13 | 0x4C | 'L' - signature |
| 14 | 0x45 | 'E' - signature |
| 15 | 0x54 | 'T' - signature |
| 16 | 0x41 | 'A' - signature |
| 17 | 0x47 | 'G' - signature |
| 18 | 0x56 | 'V' - Version |
| 19 | 0x2D | '-' - Dash |
| 20 | 0x1 | Version |
| 21 | 0xF1 | Data Field Tag for the Bonding Packet information (8-bit field indicating the data field tag) (0xA0 to 0XFF are user defined) |
| 22 | 0x15 | Data Field Length (8-bit field indicating the bytes that are followed) |
| 23 | 0x00 | Reserved |
| 24 | NUM_OF_BONDED_CHANNELS | 8 bits indicating the number of channels that have been bonded together |
| 25 | CHANNEL_NUMBER | 8 bits indicating the channel number in which this BUNDLE is inserted |
| 26-27 | BUNDLE_SIZE = 'd128 | 16 bits indicating the number of packets in the bundle |
| 28 ... 31 | BUNDLE_NUMBER | 32 bits Bundle number |
| 32 ... 33 | 0x0000 | 16 bits Reserved |
| 34 | GCBCR_BASE[32:25] | GCBCR Base MSB's |
| 35 | GCBCR_BASE[24:17] | GCBCR Base MSB's |
| 36 | GCBCR_BASE[16:9] | GCBCR Base MSB's |
| 37 | GCBCR_BASE[8:1] | GCBCR Base MSB's |
| 38 | {GCBCR_BASE[0], 6'h0, GCBCR_EXTN[8]} | |
| 39 | GCBCR_EXTN[7:0] | 9-bit GCBCR Extension in Mod-300 mode |
| 40 ... 41 | PKT_TO_PKT_DELTA_BASE[22:7] | 32 bits indicating the distance between two packets (in Mod-300 format) in terms of the 27 MHz free running clock of the head-end in the fat stream domain |
| 42 | {PKT_TO_PKT_DELTA_BASE[6:0], PKT_TO_PKT_DELTA_EXT[8]} | |
| 43 | PKT_TO_PKT_DELTA_EXT[7:0] | |
| 44 ... 187 | 0xFF | Rest of the Adaptation packet may be filled with stuffing bytes |

Figure 4:
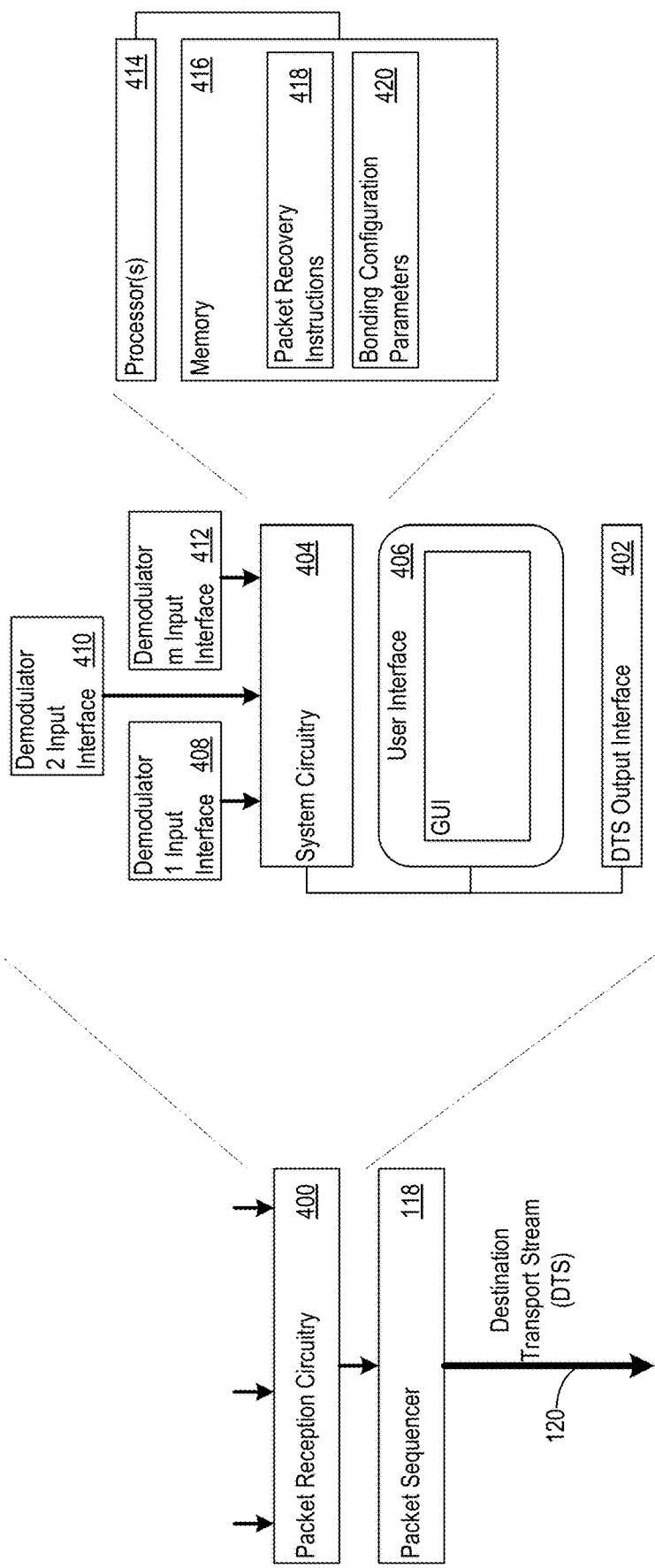
FIG. 4 shows an example implementation of packet reception circuitry.

FIG. 4 shows an example implementation of packet reception circuitry 400. The packet reception circuitry 400 includes a DTS output interface 402, system circuitry 404, and a user interface 406. In addition, the packet reception circuitry 400 includes demodulator input interfaces, such as those labeled 408, 410, and 412. The DTS output interface 402 may be a high bandwidth (e.g., optical fiber) output interface to the TIP 122, for example. The demodulator output interfaces 408-412 feed data to the collator system circuitry which will create the DTS 120 from the data received from the demodulator input interfaces 408-412. The demodulator input interfaces 408-412 may be serial or parallel bus interfaces, as examples.

The system circuitry 404 implements in hardware, software, or both, any of the circuitry described in connection with the operation of the packet reception circuitry 400. As one example, the system circuitry 404 may include one or more processors 414 and program and data memories 416. The program and data memories 416 hold, for example, packet recovery instructions 418 and the bonding configuration parameters 420.

The processors 414 execute the packet recovery instructions 418, and the bonding configuration parameters 420 inform the processor as to the type of channel bonding the processors 414 will handle. The packet reception circuitry 400 may accept input from the user interface 406 to change, view, add, or delete any of the bonding configuration parameters 420, to specify which channels are eligible for channel bonding, or to set, view, or change any other channel bonding status information.

Figure 5:
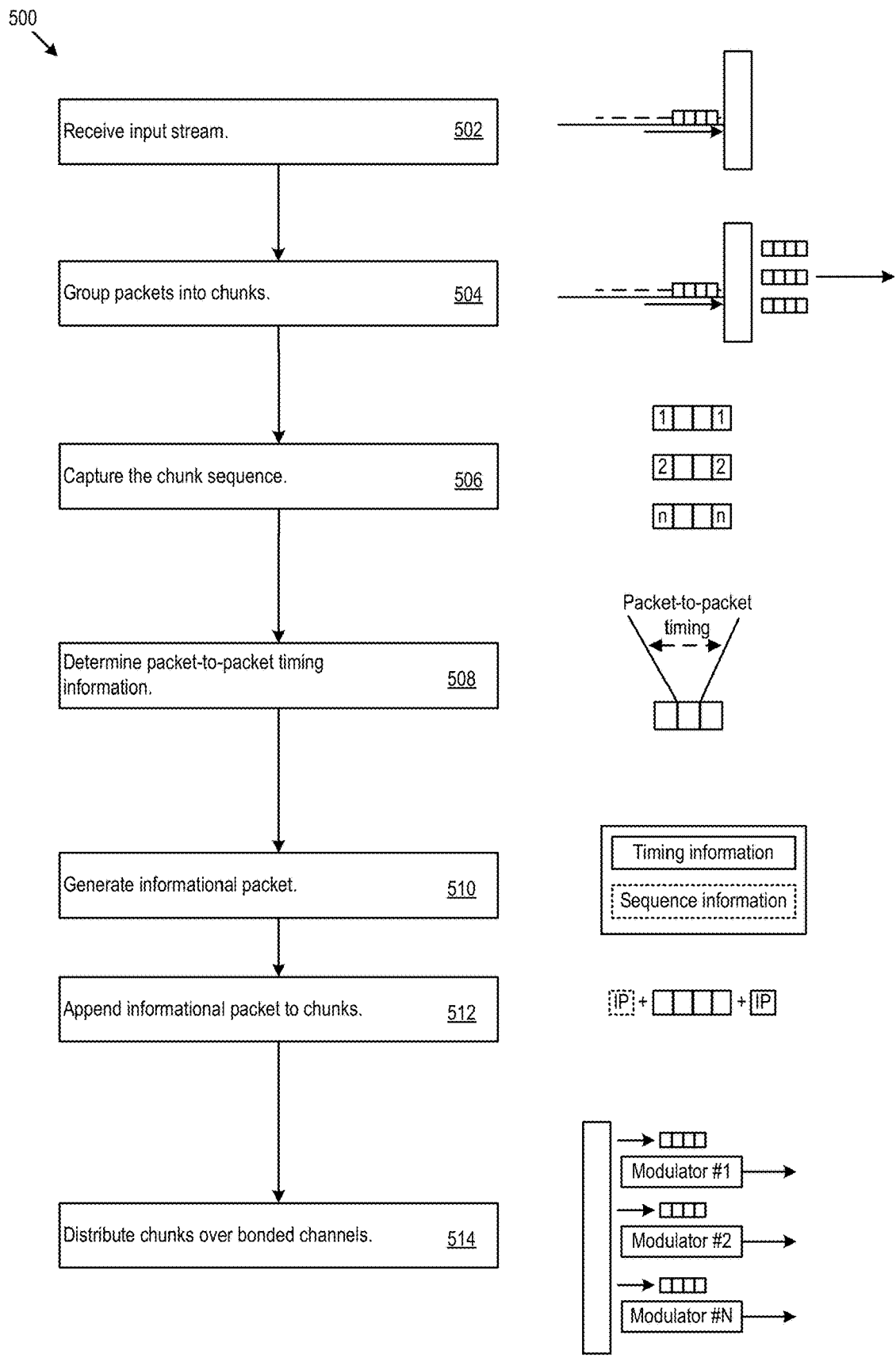
FIG. 5 shows example routing logic.

FIG. 5 shows example routing logic 500, which may be implemented on GCB router 308, for example. The routing logic 500 may receive an input stream of packets (502). The routing logic 500 may group the packets into chunks (504). For example, the routing logic 500 may group the packets into chunks of consecutive packets of a defined chunk size.

The order of the packets may be unchanged during grouping. However, the routing logic 500 may capture the sequence of the chunks, e.g., chunk sequencing information, which indicates the order of the chunks in the original input stream (506). The chunk sequencing information may be used to resequence the chunks after they are transmitted over the bonded channels.

The routing logic 500 may determine packet-to-packet timing information for the packets in the chunks (508). For example, the routing logic may use a clock reference, e.g., a GCBCR circuitry 306 reference, to determine the timings of individual packets. Additionally or alternatively, the routing logic 500 may sample certain packet timings and use the sampled packet timings for multiple unsampled packets. Additionally or alternatively, the routing logic 500 may determine estimated packet-to-packet timings by measuring the timings of chunk boundaries and dividing by the chunk size. Once the sequencing information and packet-to-packet timing information is determined, the routing logic 500 may generate an informational packet, e.g., a BIP, containing the chunk sequencing and packet-to-packet timing information (510). The routing logic 500 may append the informational packet to the chunks (512). The routing logic 500 may distribute the chunks over the bonded channels (514).

Figure 6:
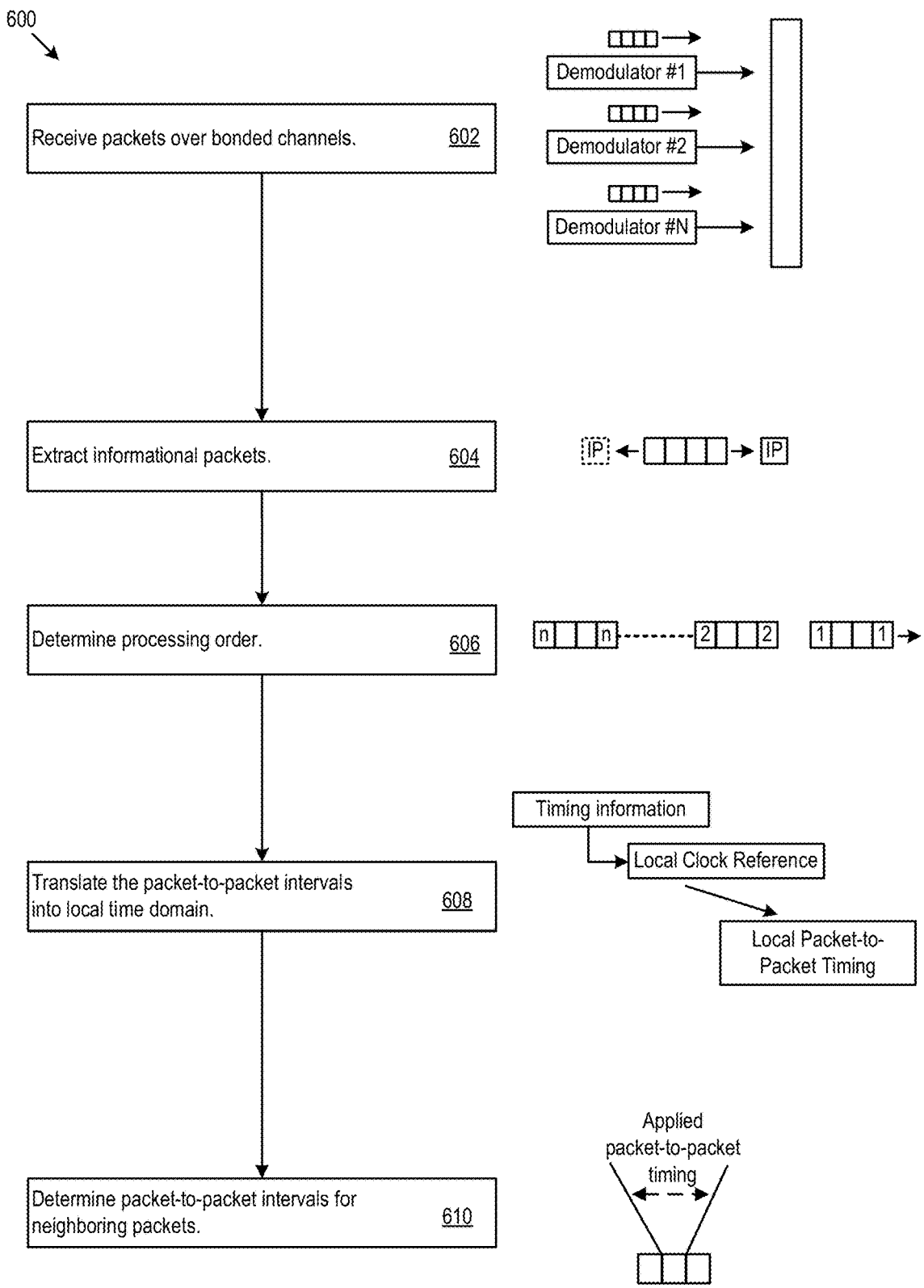
FIG. 6 shows example reconstruction logic.

FIG. 6 shows example reconstruction logic 600, which may be implemented on packet reception circuitry 400, for example. The demodulators may receive packets over the channels (602). The reconstruction logic 600 may extract informational packets from the received packet streams (604). The reconstruction logic 600 may determine the order in which to process the contents of the channel buffers based on the informational packet sequence numbers (606). The reconstruction logic 600 may translate the intervals included in the information packets into local time domain values (608). For example, the intervals may be translated into cycles of a local reference clock, such as a 27 MHz clock signal or other clock signal. The reconstruction logic 600 may determine the packet-to-packet interval for neighboring packets based on the information in the informational packets (610).

Additionally or alternatively, the reconstruction logic may locally reconstruct the packet-to-packet timings by pacing the release of packets. For example, instead of directly translating the informational packet timing information into local time domain values, the reconstruction logic 600 may release the packets from the channel buffers at the pace set forth by the information packet packet-to-packet intervals. However, other pacing or time-domain translation techniques may be used.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
   dividing an input stream into multiple chunks, the input stream comprising encoded video content;
   assigning multiple consecutive packets within the input stream to a first chunk of the multiple chunks;
   calculating, prior to transmission of the first chunk, an average packet spacing between the multiple consecutive packets within the input stream assigned to the first chunk, the average packet spacing being calculated based at least in part on sampled packet-to-packet timing for some of the multiple consecutive packets assigned to the first chunk;
   appending, to the first chunk, an informational packet containing the average packet spacing to support reconstruction, at a receiver, of the average packet spacing between the multiple consecutive packets assigned to the first chunk for decoding the encoded video content by translating, at the receiver, the average packet spacing into a local time domain value of the receiver; and
   distributing the multiple chunks over bonded transmit communication channels to the receiver, an entirety of the first chunk being distributed to one of the bonded transmit communication channels.

2. The method of claim 1, where the average packet spacing is determined based at least in part on a total end-to-end timing for the first chunk and a number of the multiple consecutive packets assigned to the first chunk.

3. The method of claim 1, where the informational packet comprises a bundle identifier packet.

4. The method of claim 3, where the average packet spacing is included within an adaptation field of the bundle identifier packet.

5. The method of claim 1, where appending the informational packet comprises appending the informational packet to one or more ends of the first chunk.

6. The method of claim 1, where the multiple consecutive packets assigned to the first chunk are not re-sequenced at the receiver.

7. The method of claim 1, where the average packet spacing is determined by measuring multiple durations between packet boundaries among the multiple consecutive packets assigned to the first chunk.

8. The method of claim 6, where the informational packet further includes sequencing information for ordering at least a portion of the multiple chunks after transmission over the bonded transmit communication channels.

9. The method of claim 1, where the multiple chunks each include the same number of packets.

10. The method of claim 1, where the multiple chunks each include $2^N$ packets, where N comprises an integer value.

11. A device comprising:
communication interface circuitry coupled to bonded transmit communication channels; and
routing circuitry coupled to the communication interface circuitry, the routing circuitry configured to:
divide an input stream into multiple chunks, the input stream comprising content;
assign multiple consecutive packets within the input stream to a first chunk of the multiple chunks;
measure durations between the multiple consecutive packets within the input stream assigned to the first chunk to determine an average packet-to-packet interval for the first chunk, the average packet-to-packet interval being determined based at least in part on measured durations between some of the multiple consecutive packets assigned to the first chunk;
append, to the first chunk, an informational packet containing the average packet-to-packet interval for the first chunk to support reconstruction of the durations at a receiver for accessing the content by translating, at the receiver, the average packet-to-packet interval into a local time domain value of the receiver; and
distribute the multiple chunks over the bonded transmit communication channels to the receiver, an entirety of the first chunk being distributed to one of the bonded transmit communication channels.

12. The device of claim 11, where the average packet-to-packet interval is determined without measuring the duration between each of the multiple consecutive packets within the input stream assigned to the first chunk.

13. The device of claim 11, where the average packet-to-packet interval is determined by measuring the durations between packet boundaries among the consecutive packets.

14. The device of claim 11, where the informational packet further includes sequencing information for ordering at least a portion of the multiple chunks after transmission over the bonded transmit communication channels.

15. The device of claim 14, where the multiple consecutive packets within the input stream assigned to the first chunk are not re-sequenced at the receiver.

16. The device of claim 11, where the routing circuitry is configured to mark a boundary between the first chunk and a second chunk of the multiple chunks by inserting the informational packet between the first and second chunks.

17. A device comprising:
communication interface circuitry coupled to bonded transmit communication channels, the communication interface circuitry configured to receive, from another device, multiple chunks over the bonded transmit communication channels, an entirety of a first chunk of the multiple chunks being received over one of the bonded transmit communication channels; and
reconstruction circuitry coupled to the communication interface circuitry, the reconstruction circuitry configured to:
for the first chunk of the multiple chunks, extract sequence data and an average packet spacing for the first chunk from an informational packet appended to the first chunk, the average packet spacing having been measured at the other device;
responsive to the sequence data, reorder the first chunk relative to at least one other of the multiple chunks without resequencing the packets within the multiple chunks;
translate the average packet spacing measured at the other device into a local time domain value; and
reconstruct the received stream within the first chunk by spacing the packets in accord with the average packet spacing translated into the local time domain value.

18. The device of claim 17, wherein the reconstruction circuitry is configured to translate the average packet spacing measured at the other device into the local time domain value by:
translating the average packet spacing measured at the other device into a cycle of a local reference clock.

19. The device of claim 17, wherein the informational packet comprises a bundle identifier packet.

20. The device of claim 17, wherein the multiple chunks each include the same number of packets.

* * * * *